United States Patent [19]

Grimes et al.

[11] 4,354,748

[45] Oct. 19, 1982

[54] PHOTOGRAPHIC EXPOSURE SYSTEM WITH COMPUTER CONTROLLED STROBE UNIT

[75] Inventors: Donald L. Grimes, Milford; Stanley W. Haskell, Arlington, both of Mass.

[73] Assignee: Polaroid Corporation, Cambridge, Mass.

[21] Appl. No.: 275,718

[22] Filed: Jun. 22, 1981

[51] Int. Cl.³ .............................................. G03B 7/097
[52] U.S. Cl. .................................. 354/23 D; 354/33; 354/29
[58] Field of Search ................... 354/23 D, 33, 26, 29, 354/30

[56] References Cited

U.S. PATENT DOCUMENTS

| | | | |
|---|---|---|---|
| Re. 29,599 | 3/1978 | Ogawa | 354/23 D |
| 3,710,701 | 1/1973 | Takishima et al. | |
| 3,738,242 | 6/1973 | Lee et al. | |
| 3,742,828 | 7/1973 | Nakajima et al. | |
| 3,836,920 | 9/1974 | Uchiyama et al. | 354/27 |
| 3,928,859 | 12/1975 | Peterson | 354/27 |
| 4,005,444 | 1/1977 | Uchiyama et al. | 354/27 |
| 4,024,549 | 5/1977 | Matsumoto | 354/33 |
| 4,035,814 | 7/1977 | Nobusawa | 354/33 |
| 4,065,776 | 12/1977 | Iwata et al. | 354/23 D |
| 4,187,019 | 2/1980 | Uchiyama et al. | 354/33 |
| 4,236,794 | 12/1980 | Gordon | 354/25 |
| 4,297,011 | 10/1981 | Adams, Jr. | 354/23 D |
| 4,297,012 | 10/1981 | Nakai | 354/23 D |
| 4,317,624 | 3/1982 | Shenk | 354/23 D |
| 4,325,614 | 4/1982 | Grimes | 354/23 D |

OTHER PUBLICATIONS

"Photographic Shutters: better pictures with a reconsideration of shutter efficiency", Applied Optics, vol. 16, No. 7, Jul. 1977, pp. 1914–1917.

*Primary Examiner*—Russell E. Adams
*Attorney, Agent, or Firm*—John S. Vale

[57] ABSTRACT

A microcomputer is used in an exposure control system and method for developing and controlling execution of a film exposure strategy based on selected pre-exposure inputs including scene brightness level and camera-to-scene distance. The computer is preprogrammed with shutter trajectory and strobe operating parameter data bases. In the ambient light mode, a trajectory signal program correlated to the scene brightness level is developed and fed to a stepper motor which drives a dynamic aperture shutter in a manner whereby its operation is characterized by an aperture size versus time trajectory curve defined by the developed signal program. In the strobe flash mode, the trajectory curve correlated to scene brightness is tailored to enhance flash mode operation and an appropriate strobe firing aperture and quench time is automatically selected in accordance with both the brightness and camera-to-scene distance inputs to control the strobe contribution to exposure value.

16 Claims, 7 Drawing Figures

PHOTOGRAPHIC EXPOSURE SYSTEM WITH COMPUTER CONTROLLED STROBE UNIT

BACKGROUND OF THE INVENTION

The present invention relates to the field of photography and, more specifically, to automatic exposure control systems and methods incorporating a microcomputer for developing a film exposure strategy or program based on certain pre-exposure scene information inputs and for, thereafter, controlling operation of selected system components during the film exposure phase to carry out the developed strategy.

"Frame the scene in the viewfinder and then press the cycle start button!" With today's fully automatic cameras, that is about all the instruction anyone needs to take highly acceptable photographs on a consistent basis.

The extent to which cameras aimed at the mass amateur market have been automated is typified by the self-developing SX-70 and Pronto! Autofocus Land Cameras marketed by Polaroid Corporation, Cambridge, Mass. In response to actuation of the automatic camera cycle, a sonar ranging system measures camera-to-scene distance and sets the objective lens at the correct focus position, the film unit is automatically exposed in accordance with the scene brightness level measured by a photocell circuit, and then the exposed film unit is advanced automatically between a pair of pressure applying rollers to initiate a well-known development and diffusion transfer process.

These cameras also are configured for automatic flash mode operation employing flashbars (an array of flashbulbs) and/or strobe units. Not only do such cameras operate in a conventional flash mode when ambient light is very low so that exposure illumination is provided primarily by the artificial light source, but they also operate in an automatic fill flash mode at higher ambient light levels. In this mode, artificial illumination is mixed proportionally with ambient light for the purpose of eliminating or softening shadows, or for adding additional illumination to dark areas of the scene to bring out the details thereof.

In the above-noted cameras, transmission of image forming light to the film plane is controlled by a dynamic aperture scanning shutter which employs an integrated blade mechanism having a pair of counter-reciprocating blades for defining both effective aperture and exposure interval.

The blades are displaceable between a closed light blocking position and a fully open position where the blades define a maximum obtainable aperture. As the blades open, the aperture progressively increases in size (area) until a peak aperture, determined by appropriate exposure parameters, is reached. Thereafter the direction of blade displacement is reversed and the effective aperture progressively decreases in size until the shutter closes to terminate the exposure interval.

Operation of the blade mechanism may be characterized by an aperture size versus time (exposure interval) trajectory curve that provides both quantitative and qualitative information about the resultant exposure.

When the intensity of the image forming light is known, the area bounded by the curve is indicative of the exposure value or total amount of light reaching the film plane.

The general shape of the trajectory curve determines the nature of the exposure in terms of motion stopping ability, depth of field and other parameters. For example, the blade mechanism may be driven rapidly to quickly reach a relatively large peak aperture and then close in the same manner. The exposure interval is relatively short providing good motion stopping ability. However, depth of field will suffer somewhat because of the large peak aperture. For the same exposure value, the blade mechanism may be driven more slowly and attain a smaller peak aperture to improve depth of field, but the exposure interval must be increased accordingly and motion stopping ability will be diminished. For general picture taking situations, however, the trajectory curve shape should fall somewhere between these two extremes and provide an optimized balance between motion stopping ability and depth of field.

In recent years, there have been dramatic improvements in the image quality of photographs made with fully automatic cameras. Some of these improvements result from better shutter mechanisms, increased precision in measuring scene brightness levels over a wide range of conditions and distances, and more accurate control over the entire exposure system. Other improvements have been obtained by adding new subsystems, such as automatic ranging and focusing, and proportional fill flash.

For the most part, advances in image quality have been made by automating well-known exposure methods that previously required the operator to have extensive understanding of the photographic process.

Now that this approach has been extensively exploited, there are many that believe that future improvements in image quality will be derived mainly from the development of new exposure methods and/or significant modifications of contemporary techniques.

In the dynamic aperture shutter field there has been some work done exploring the effect of trajectory curve shape on depth of field and motion stopping ability parameters and suggesting optimized balanced trajectories that are generally triangular in shape but include opening and closing portions (sides) that are somewhat concave. For example, see "Photographic Shutters: Better Pictures With A Reconsideration Of Shutter Efficiency" by William T. Plummer, *Applied Optics*, vol. 16, page 1914, July 1977.

There are many questions yet left to be answered. For example, how should the trajectory be shaped for optimized flash and fill flash photography? Can the trajectory curve be shaped to exploit the advantages of a given imaging optical system while minimizing its drawbacks? There are still legitimate debates about the relative merits of follow focus, strobe quench and hybrid flash systems. Automatic fill flash is relatively new. What is the optimum ratio of ambient to strobe light? when the ambient brightness level is sufficient to provide a predetermined level of natural light contribution for the exposure, should an attempt be made to keep this ratio constant or should it be varied as a function of scene brightness level and/or distance?

What is needed to keep pace with advances in exposure techniques is a truly versatile exposure control system. That is, a system that can automatically provide a great variety of different trajectory shapes, in response to various inputs, that will define the nature of the exposure and also easily manipulate the complex interactive variables of exposure decision making to control ambient and flash modes of operation.

Commonly assigned copending application U.S. Ser. No. 216,831, filed on Dec. 16, 1980, discloses an exposure control system that is configured for ambient light operation and exhibits the required versatility for exploring new exposure techniques in that its shutter operation is controlled by a microcomputer which is programmed to provide a wide variety of different trajectory curve shapes in response to automatic inputs indicative of scene conditions and/or manual inputs relating to operator preferences for curves that emphasize either depth of field or motion stopping ability.

The shutter blade mechanism is driven by a stepper motor which responds to a selected program of trajectory signals for displacing the blades in a manner to produce a corresponding trajectory defined by the signal program. In response to various pre-exposure inputs, including scene ambient brightness level, the computer utilizes a preprogrammed trajectory data base to develop an appropriate program of trajectory signals which it then feeds to the stepper motor.

The present invention is directed to an expansion of this system's capabilities by adding a strobe flash subsystem that is highly versatile and takes a new approach to flash mode operation. Not only is the flash subsystem compatible with the stepper motor driven shutter, but it may be added at a relatively low cost because its operation is programmed and controlled by a moderately expanded version of the same microcomputer that operates the exposure control system in the ambient light exposure mode.

As noted earlier, proportional fill flash systems are well known in the prior art. When ambient light levels are relatively low, most of the exposure illumination is provided by the strobe unit. However, when the ambient brightness level increases to a predetermined level so that natural light may provide a fixed percentage (e.g., 75%) of the optimum exposure value, the strobe output level is automatically adjusted, as a function of subject distance and ambient scene brightness level, to provide the remaining percentage of light needed to reach full exposure value.

There are numerous approaches to providing proportional fill flash. For example, some systems operate in a follow focus mode whereby a fixed output strobe is fired at an aperture that is correlated to scene distance. Other systems utilize strobe quenching techniques and fire the strobe at the peak aperture, set for the ambient contribution in accordance with scene brightness level or other strobe firing aperture, and vary the strobe's output in proportion to scene distance. Still other systems combine these two techniques by using follow focus for scene distances up to 9 to 10 feet and then shifting to a quench method for scene distances beyond this range. For representative examples of these systems, reference may be had to commonly-assigned copending application, U.S. Ser. No. 135,521, filed on Mar. 31, 1980 and entitled "Exposure And Flash Fire Control System" and the additional references set forth therein.

Also, a number of prior art references are relevant for showing automatic flash firing systems wherein digital computation techniques are used to determine the appropriate flash firing parameters based on scene range and ambient brightness level inputs. For representative examples, see U.S. Pat. Nos. RE-29,599; 3,928,859; 4,005,444; 3,836,920; 4,187,019; 4,024,549; 3,710,701; and 3,742,828. U.S. Pat. No. 4,035,814 discloses an exposure control system that utilizes a digital counter memory subsystem for determining flash parameters in response to scene brightness and distance inputs. U.S. Pat. No. 4,065,776 is relevant for disclosing a flash fire system configured for use with a stepper motor driven shutter. U.S. Pat. Nos. 3,738,242 and 4,236,794 are relevant for showing photographic systems wherein at least a part of the photographic processes is controlled by digital computer that includes a preprogrammed data base or matrix table.

A common drawback of these prior art exposure control systems is that they tend to be unduly constrained and limited in their operation, thereby lacking the versatility required to approach optimizing the different exposure modes and options. That is, some systems only can provide one general trajectory shape and this is usually optimized for ambient mode operation. Therefore, there is a prior restraint of having to make the flash mode operation conform to the ambient trajectory shape. Other systems may change the trajectory for better flash mode operation, but suffer in the fill flash mode because the ambient contribution is made with a trajectory shape that may be optimized for strobe contribution at low ambient light levels.

Therefore, it is an object of the present invention to provide a highly versatile automatic exposure control system for ambient light and strobe flash photography.

It is another object to provide such an exposure control system that is easily to adaptable to new exposure techniques.

It is yet another object to provide such a system that is capable of extending the useful range of a given strobe unit by employing a unique method of selecting flash mode parameters.

Still another object of this invention is to provide such a system that is programmable.

Another object is to provide an automatic exposure control system that is controlled by a microcomputer which utilizes preprogrammed trajectory curve and strobe operation data bases in the automatic strobe mode exposure decision making process.

It is also an object of this invention to provide photographic apparatus, including a camera, incorporating such an automatic exposure control system.

Other objects of the invention will, in part, be obvious and will, in part, appear hereinafter.

SUMMARY OF THE INVENTION

The present invention provides an automatic exposure control system usable in a camera for controlling transmission of image forming light rays from a scene to a film unit in a film plane during ambient light and strobe flash illumination modes of operation.

The system includes a blade mechanism mounted for displacement between a first arrangement where it blocks transmission of scene light to the film plane and a second arrangement where it defines a maximum aperture. The blade mechanism serves to define a range of progressively increasing sized apertures as it moves from its first arrangement toward its second arrangement and then a range of progressively decreasing sized apertures as it returns to its first arrangement for regulating transmission of scene light to the film plane during the course of an exposure interval.

The means for driving the blade mechanism preferably include a stepper motor which is responsive to a program of trajectory signals whereby operation of the blade mechanism is characterized by an aperture size versus time trajectory curve defined by the program of trajectory signals.

The system is configured to be connected to a variable output quenchable strobe unit which provides a source of artificial illumination directed towards the scene. The light output of the strobe unit can be varied between minimum and maximum output values by adjusting the timing of a quench signal provided to the strobe unit subsequent to its firing.

The system also includes means for selectively setting the system in either the ambient light or strobe flash mode of operation and a microcomputer for developing an exposure strategy based on certain inputs relating to the scene or subject and for thereafter controlling operation of the system to carry out the developed strategy.

The computer is formed in part by first and second memory sections. The first memory section has a preprogrammed trajectory data base stored therein which includes at least characterizing elements of a plurality of different trajectory signal programs defining corresponding ambient light and strobe flash mode trajectory curves that are appropriate for differing scene brightness levels. The second memory section has a preprogrammed strobe operation data base stored therein providing strobe firing aperture and quench time data which is correlated to at least one set of flash mode trajectory curves for various combinations of scene brightness level and range.

The computer is preprogrammed to respond to at least a pre-exposure scene brightness level input signal, when the system is set for ambient light mode operation, for utilizing the trajectory data base and developing therefrom a program of trajectory signals appropriate for the indicated scene brightness level and for thereafter feeding the developed program of trajectory signals to the blade drive means for effecting exposure of the film unit. The computer is also preprogrammed to be responsive, when the system is set for flash mode operation, to both the brightness input signal and to a pre-exposure range signal indicative of camera-to-scene distance for selecting a correlated strobe firing aperture and quench time from the strobe operation data base and thereafter providing corresponding strobe firing and quench signals to the strobe unit at appropriate times during the exposure interval defining operation of the blade mechanism.

The system is configured to operate in a proportional fill flash mode when the indicated scene brightness level is sufficient to provide at least 75% of the optimum exposure value determined by the film speed. The trajectory shapes used in the flash mode to provide the ambient contribution differ in shape somewhat than the trajectory curves that are employed for ambient light operation. That is, the flash mode curves tend to be a little steeper and reach a higher peak aperture to extend the range of apertures available for providing the strobe contribution to the exposure.

Unlike some flash systems known in the prior art the present invention varies both aperture and strobe output level in the process of mixing ambient and flash illumination to provide good fill flash.

In this method, the total effective range of the strobe unit is divided linearly into sequential zones. In response to a range signal, which may be provided by an autofocusing system, the computer consults the strobe operation data base and identifies the particular zone in which the subject falls. Based on this identification a flash firing aperture is selected that correlates to the distance range of the zone in which the scene is located. The amount of flash output, determined by quench time, is then selected in proportion to the distance that the scene extends into the particular zone. Thus, if the scene is at the close end of the zone, the strobe will be instructed to provide its minimum output. If the scene is at the far end, the strobe output will be at its maximum. That is, strobe output is proportional to the location of the scene within the zone. The computer then checks to find out if the selected strobe firing aperture will be reached by the trajectory that the computer selects based on scene brightness level. At high ambient light levels, it is possible that the peak aperture set to control the ambient contribution will be smaller than the selected strobe firing aperture. In this case, the computer will incrementally extend the selected quench times so that the flash output is increased in a compensating manner. When additional correction is not possible, the system will automatically fire the strobe unit at the peak aperture at maximum strobe output.

Advantageously, it has been found that by varying both aperture and strobe output in accordance with scene brightness level and distance, the range of camera-to-scene distance over which the system can provide good control over flash exposures has been extended as will be described in detail hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
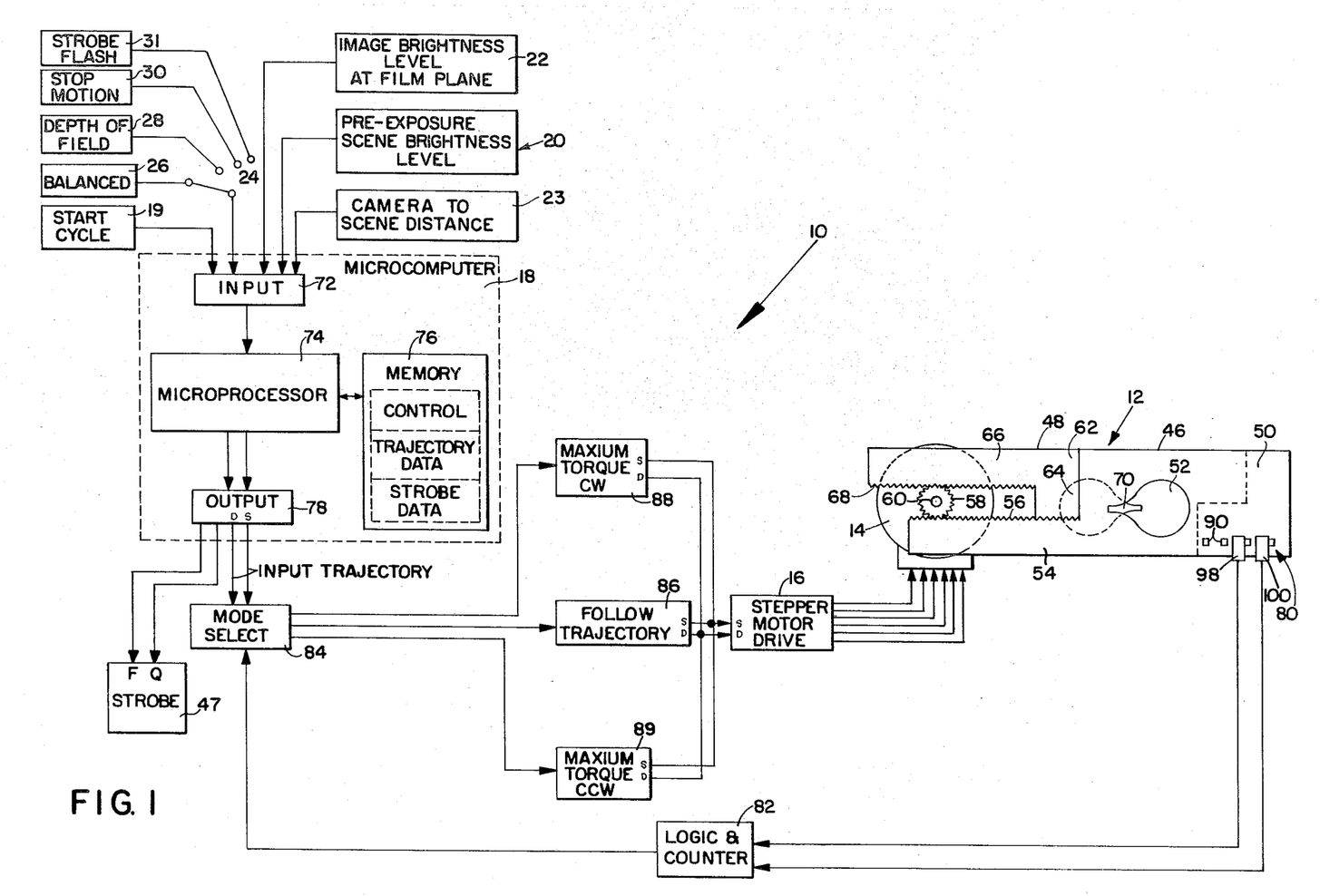
FIG. 1 is a block diagram showing an automatic exposure control system embodying the present invention.

An automatic exposure control system 10 incorporating the present invention is shown in block diagram form in FIG. 1.

System 10 includes a dynamic aperture scanning shutter blade mechanism 12 which is configured to be driven by a reversible stepper motor 14 operated, in a closed loop manner by a stepper motor drive circuit 16 (and later-to-be-described position feedback control loop and drive mode selection system) under the control of a microcomputer 18. The operation of a microcomputer 18 is, in turn, responsive to a plurality of inputs. These include a cycle start input 19 provided in response to the operator manually actuating an exposure cycle start button and automatically provided inputs such as a pre-exposure scene ambient brightness level, designated 20, an image brightness level at the film plane, measured during the course of an exposure interval, designated 22, and a camera-to-scene distance input, designated 23, which is preferably provided by a sonar ranging and lens focusing system which may be of the type disclosed in commonly-assigned U.S. Pat. No. 4,081,626. Additional inputs may be provided manually by the operator. For example, the operator may set a four-position switch 24 to select a normal or balanced mode 26, a depth-of-field emphasizing mode 28, a motion stopping emphasizing mode 30, or a strobe flash mode 31. If the strobe unit is not permanently attached to the system, switching to the flash mode may take place automatically in response to operatively connecting the strobe unit.

As will become more apparent later, in the balance mode, the microcomputer 18 utilizes a trajectory program appropriate for general ambient light photography whereby blade mechanism 12 is operated in a manner that is balanced or optimized for the best compromise between depth of field and motion stopping ability. The selection of either the depth of field or stop motion modes overrides the provision of the general photography program and substitutes therefor appropriate trajectory programs which emphasize the selected characteristics, i.e., effective aperture or exposure interval. In the strobe flash mode, the computer 18 utilizes a flash mode trajectory program and a strobe operating data base for selecting strobe operating parameters such as strobe firing aperture and quench time.

Figure 2:
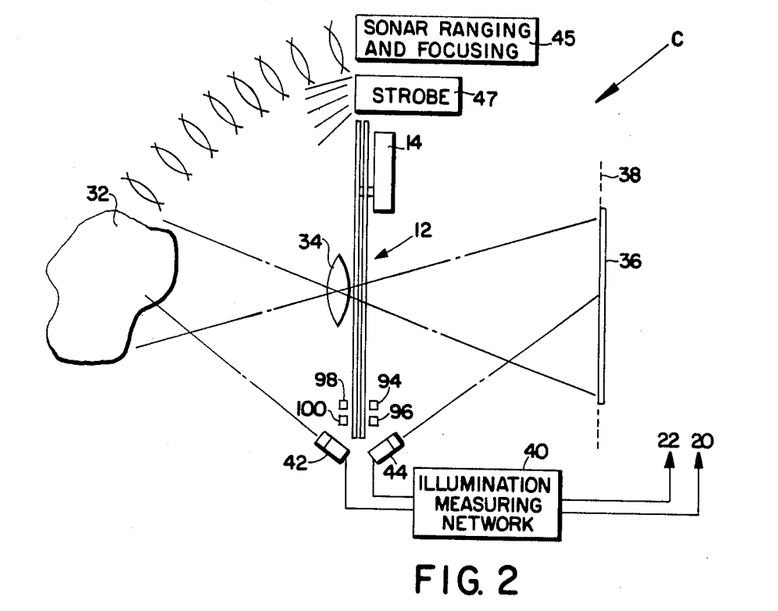
FIG. 2 is a diagrammatic top view of selected components of a photographic apparatus incorporating said exposure control system.

As shown diagrammatically in FIG. 2, the exposure control system 10 is intended for use in photographic apparatus, such as a camera C or the like, for controlling the transmission of image forming light rays of a scene 32 provided by objective lens 34 to a film unit 36 located at the camera's film plane 38. System 10 also includes an illumination measuring network 40 which utilizes a first photocell 42 mounted on the camera to receive the light from a selected portion of the field of view of lens 34 and providing the pre-exposure scene brightness level input 20 and a second photocell 44 mounted on the interior of the camera for receiving light from the image formed at the film plane on a film unit 36 for providing input 22 to the microcomputer 18. Alternatively, a measure of scene brightness may be obtained by using a single photocell directed toward the scene through appropriate aperture shapes associated with the blade mechanism to provide both the pre-exposure input 20 and then the input 22 during the course of the exposure interval. The camera-to-scene distance input 23 is provided by a sonar ranging and focusing system 45. Also shown is a variable output electronic strobe unit 47 for providing a source of artificial illumination directed toward the scene 32. The light output of strobe unit 47 may be varied between minimum and maximum values by adjusting the interval between strobe firing and quenching signals.

It will be understood that within the context of this disclosure the term "brightness" or "brightness level" is intended to mean the illumination level of the scene or image at the film plane as it is commonly measured in the photographic art for determining proper film exposure value.

Returning to FIG. 1, blade mechanism 12 is of the integrated type that performs both the effective aperture and exposure interval defining functions. In the illustrated embodiment, blade mechanism 12 comprises a pair of thin, elongated blade members 46 and 48 mounted by means (not shown) in superposed relation for simultaneous reciprocal displacement in opposite directions, in response to rotation of stepper motor 14, between positions blocking and unblocking the transmission of image forming light to the film plane 38.

The forwardmost blade member 46 includes a generally rectangular major section 50 having a longitudinally tapered opening 52 therein; and an integrally formed elongated drive arm 54 extending laterally (to the left) from the lower left-hand end of major section 50 and including on the upper horizontal edge thereof an integrally formed toothed rack 56 that is in mesh with the underside of a drive pinion 58 fixedly secured to the drive shaft 60 of stepper motor 14.

The rear blade 48 includes a major section 62 having a complementary tapered opening 64 therein; and an integrally formed upper drive arm 66 having a toothed rack 68 on its lower horizontal edge in mesh with the top side of drive pinion 58.

In response to a counterclockwise rotation of motor 14 gear 58 will drive forward blade member 46 to the right and simultaneously drive rear blade member 48 to the left so that openings 52 and 64 will be completely out of registration with their narrow tapered ends in facing relation to define the closed or light-blocking position of blade mechanism 12. In response to clockwise rotation of motor 14, the blades are driven in the opposite directions so that openings 52 and 64 progressively overlap and cooperate to define an exposure aperture 70 that is centered on the optical axis of objective lens 34. As blade members 46 and 48 move away from the closed position, exposure aperture 70 becomes progressively larger until it defines a maximum obtainable aperture wherein the major portions of openings 52 and 64 are in full registration. As the blade members 46 and 48 are driven back toward the closed position, exposure aperture 70 progressively decreases in size until it closes.

The change in size of the exposure aperture 70 with each incremental step of the blade mechanism 12 will, of course, depend on the selected shape for the openings 52 and 64. It should be understood that it is within the scope of the present invention to use openings 52 and 64 that provide either linear or nonlinear rates of changes in exposure aperture size as a function of blade displacement and that the particular shape of the openings 52 and 64 shown in FIG. 1 are by way of illustration only.

Figure 3:
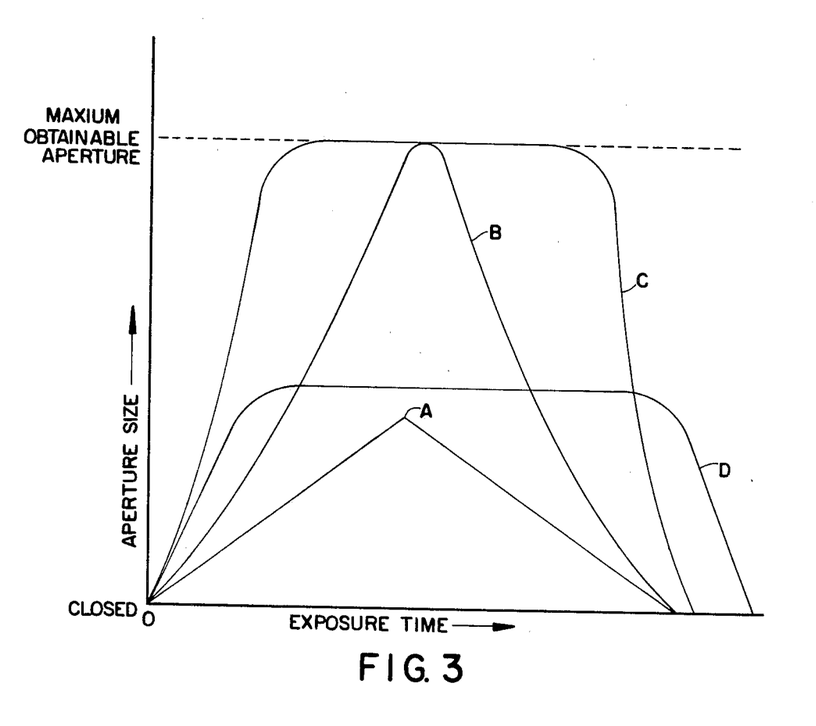
FIG. 3 is a graph showing a variety of different shaped aperture size versus exposure time trajectory curves.

With reference to FIG. 3, the operation of blade mechanism 12 and the nature of the resultant exposure may be characterized by an aperture size or area (Y-axis) versus exposure time or interval (X-axis) trajectory curve. The area under the trajectory curve is indicative of the total quantity of ambient image light of known intensity that impinges upon the film unit. The shape of the curve, however, defines the average or effective aperture and exposure interval and is therefore indicative of depth of field and motion stopping ability.

In terms of photographic performance, the versatility of a scanning shutter mechanism can be rated on its ability, or lack thereof, to generate a variety of different trajectory curves utilizing the largest possible portion of the plotting area. There are, of course, some practical limitations to full utilization of the plotting area in that mechanical shutters and their drive systems inherently have mass and inertial characteristics that preclude instantaeous blade movement from a closed position to a predetermined aperture. But, in general, a blade mechanism that can be driven in a controlled manner at a relatively fast maximum rate will be more versatile than a shutter that has a lower rate limit.

Let's assume that the apertures 52 and 64 in blade mechanism 12 are designed so that exposure aperture 70 increases in size linearly as a function of blade displacement.

If the drive system for stepper motor 14 can operate only at a fixed rate, as is common in many stepper motor shutters known in the prior art, then the variety of trajectory curves that can be generated is severely limited. For example, trajectory curve A is triangular in shape and indicates that the aperture increases at a fixed rate to a peak aperture and then decreases at the same rate until the shutter closes. Because the rate of blade displacement is fixed, the slope of the opening and closing portions of the trajectory cannot be changed. If exposure interval is increased, the size of the peak aperture increases accordingly. The trajectory shape can be changed somewhat, however, by stopping blade displacement at a given peak aperture for a given time before closing so that the trajectory has a truncated shape. Versatility is still quite low because the trajectories are constrained to a family of curves that have fixed slopes in their opening and closing sections.

The performance versatility of blade mechanism 12 can be increased substantially by providing a drive system wherein the rate at which stepper motor 14 is driven can be changed. For example, to photograph a very bright scene, it may be desirable to open the blades slowly (shallow slope) to a relatively small peak aperture and then close the blades at the same rate. The high brightness level will keep the exposure interval short (good motion stopping ability) while the relatively small effective aperture will insure good depth of field.

If one wishes to photograph a scene that is less bright but yet maintain the same exposure interval, the blade mechanism 12 should be driven at a faster rate so that it reaches larger peak and effective apertures during the course of the exposure interval. Under the same scene lighting conditions, a variable drive rate shutter will also allow a choice of trajectory curve shapes to emphasize different exposure parameters. Obviously, then, a shutter in which the rate of blade displacement can be changed for different exposures has increased versatility.

By the same token, if the rate of blade displacement can also be changed during the exposure interval to provide blade acceleration or deceleration, then the trajectory curves are no longer limited to having linear opening and closing portions and versatility is once again increased. For example, curve B shows a generally triangular trajectory that has sagging or approximately parabolic sides and under current thinking tends to be the best balanced compromise between depth of field and motor stopping. In this exposure, the blade mechanism opens to the maximum aperture and then closes in the same manner so that the closing section of the trajectory is a mirror image to the opening section. Trajectory C is indicative of an exposure where the blades open at a much faster rate to the maximum aperture where it is maintained for a period of time before it closes. Trajectory D indicates that the blades open at some intermediate rate to a peak aperture, well below maximum aperture, where it is held for a period of time before it is closed. Thus, if the motor drive system can operate at different rates, and provide blade acceleration and deceleration during exposure, then the scanning shutter system will be highly versatile in that a greater number of different shaped trajectories may be generated to best accommodate a variety of photographic situations.

A stepper motor drive system was chosen for exposure control system 10 because it can be accelerated and decelerated in a controlled manner during the course of a typical exposure interval to generate a large number of different trajectory curve shapes and it is also compact and relatively inexpensive considering its intended function.

A stepper motor suitable for use in exposure control system 10 typically has a permanent magnet rotor with four coil unipolar or bifilar windings. In the illustrated embodiment, the blades 46 and 48 are typically displaced one-half inch between the closed and maximum aperture defining positions. A 24-step/revolution motor (15°/step) may be operated in a half-step mode (48-steps/revolution) and drive the blades 46 and 48 between the closed and maximum aperture defining position with 180° rotation, i.e., 24 steps (7.5°/step). For best acceleration characteristics, the holding torque-to-inertia (rotor plus load) ratio should be as large as possible. Those having skill in the stepper motor art will appreciate that motor 14 may be operated in the half step mode simply by changing the pattern of coiled energization so that on an alternating basis, either one or two coils at a time are energized to effect stepping.

The stepper motor drive circuit 16 is responsive to pulse inputs (direction of rotation at terminal D and stepping sequence at terminal S) for effecting the correct sequence of coil energizations to control the rate and direction of motor drive. Such drive circuits are well known in the art and need not be described further here to understand the present invention.

Trajectory input from microcomputer 18 comprises a program of trajectory signals for controlling the rate and direction of rotation of motor 14 so that blade mechanism 12 operates in a manner characterized by a corresponding trajectory curve. The trajectory program includes appropriate clockwise and counterclockwise rotation signals that are ultimately fed to terminal D of circuit 16 and a series of motor stepping pulse signals which are fed to terminal S for controlling the angular rotation between the rotor and stator magnetic fields to effect operation of stepper motor 14.

The microcomputer 18 comprises an input device or buffer 72 for feeding the previously noted inputs in appropriately encoded form to a microprocessor or central processing unit 74. Microprocessor 74 interacts with a preprogrammed read only memory (ROM) 76 which has separate sections for storing the control program defining the computer's operating instructions; a trajectory data base which microprocessor 74 will utilize to develop a plurality of different trajectory signal programs, appropriate for both ambient light and strobe flash operation, in response to the different inputs; and a strobe operating data base which will be used in conjunction with scene brightness level and range inputs to select an appropriate strobe firing aperture and quench time. The output from microprocessor 74 is fed through an output device or buffer 78 to the motor drive system and strobe unit 47.

While the stepper motor 14 could be driven in an open loop manner, the performance level of the system is somewhat enhanced by adding a position feedback control loop.

This control loop includes a blade displacement encoder system 80 for monitoring the stepwise position of blade member 46 during the course of an exposure interval; a logic and counter network 82 for receiving pulse signals from encoder system 80 and providing a displacement output signal indicative of the stepwise position of blade member 46; and a mode select network 84 for receiving and comparing the input trajectory signal with the displacement signal and providing to stepper motor drive circuit 16 either a follow trajectory input 86 comprising the original input trajectory signal from microcomputer 18 when the blade member 46 is in the correct position for the planned trajectory or, when there is a large enough variance between the displacement output and the trajectory output, a corrective signal program which switches the stepper motor to a maximum torque mode of operation via the provision of either maximum torque-clockwise or maximum torque-counterclockwise input, designated 88 and 89 respectively.

In the illustrated embodiment, the encoder system 80 is an optical two quadrature track encoder that senses the position of blade member 46 throughout the exposure interval. The encoder system comprises a longitudinally extending array of vertical slits 90 in blade member 46, a pair of light emitting diodes (LEDs) 94 and 96 (see FIG. 2) positioned behind slits 90 and a corresponding pair of aligned photosensitive detectors or photocells 98 and 100 located on the forward side of the blade member 46 in front of slits 90 and in alignment with the LEDs. In response to movement of blade member 46, the slits 90 and the intervening opaque segments therebetween sequentially unblock and block transmission of light from the LEDs to the corresponding photocell detectors 98 and 100 to produce a digitally encoded output therefrom in a well-known manner.

The outputs from detectors 98 and 100 are fed to network 82 which includes a logic circuit for decoding directional information and a counter for counting each step of blade displacement. Typically, the count is set at 0 when the blades are at the initial position several steps beyond the closed position to insure the apertures are fully out of registration for light sealing purposes and the count increases as the blades move in the opening direction and decreases in response to a directional change signal when the blades reverse direction.

The mode select network 84 is a logic subsystem which compares the blade displacement output or count from network 82 with the directional and stepping pulse input trajectory signals (D and S) provided by microcomputer 18. If there is correlation, indicating that the blade member 46 is in the correct position to follow the planned trajectory, then network 84 operates in its normal follow trajectory mode (input 86) and continues to supply the original trajectory signal program from microcomputer 18 to the stepper motor drive circuit 16. However, if the signal comparison indicates that blade member 46 is either ahead of or is lagging behind the correct position too much, network 84 automatically switches to a maximum torque mode of operation and provides a corrective signal program to operate the stepper motor drive circuit 16 in a maximum torque mode. The corrective signal program comprises the provision of appropriate maximum torque directional and stepping pulse inputs 88 or 89 to either accelerate or decelerate motor 14 and thereby move the blade mechanism 12 toward the correct position. Such corrective action will continue until the feedback count from network 82 indicates that the blade mechanism 12 is at its correct position to generate the planned trajectory at which point network 84 automatically switches back to the follow trajectory mode resuming the provision of input 86.

For a more detailed description of the position feedback control loop and the mode select system along with the various components and subsystems forming parts thereof, reference may be had to commonly-assigned copending application U.S. Ser. No. 216,831 now U.S. Pat. No. 4,325,614 filed on Dec. 16, 1980 by Donald L. Grimes and entitled "Exposure Control System With Shutter Operation Controlled By A Microcomputer", said copending application being incorporated by reference herein.

In FIG. 1, the major components of microcomputer 18 are shown separately merely to identify their functions. In its actual construction, microcomputer 18 may be formed on a single substrate (computer on a chip) or may comprise a plurality of appropriately interconnected separate large scale integrated circuits.

The use of microcomputer 18 to define and control the operation of the blade mechanism 12 and the strobe unit 47 in response to one or more inputs provides a great deal of flexibility in how the exposure control system may be used because selection of the operating characteristics of these components now simply becomes a matter of programming microcomputer 18. Advantageously, the addition of the flash mode capability to the exposure control system may be achieved at relatively low cost in that it can be readily accomplished by using a moderately upgraded version of the microcomputer that is used in the exposure control system used in the previously-noted copending application U.S. Ser. No. 216,831 now U.S. Pat. No. 4,325,614.

Although not shown in the drawings, it should be obvious to those having ordinary skill in the art that computer 18 may be programmed in a more detailed manner to be responsive to additional inputs including those relating to film speed or other characteristics for providing a greater number of different trajectory signal programs. More importantly, perhaps, exposure control system can be periodically updated at the factory by reprogramming microcomputer 18 to take advantage of new ideas in exposure control.

Ambient Mode Operation

As an example of how system 10 functions in the ambient mode when the scene is illuminated by natural light, let's assume that the system is configured as shown in FIGS. 1 and 2 with the mode selection switch 24 in the balanced position to provide input 26. In response to the operator actuating cycle start button 19, illumination measuring circuit 40 and its associated photocell 42 are energized to provide a pre-exposure scene brightness level input 20. The sonar ranging system 45 automatically operates at the same time providing a distance measurement input and setting the lens 34 in the correct focus position. The distance input is not utilized for ambient mode operation.

Figure 4:
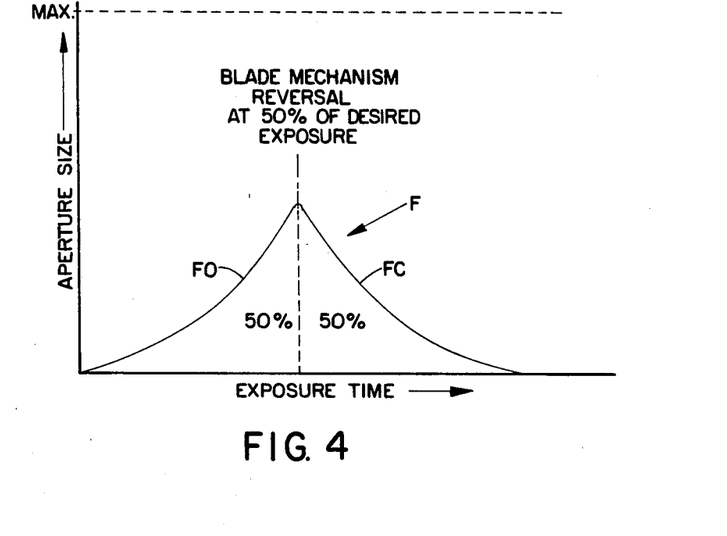
FIG. 4 is a graph showing a typical trajectory curve for balanced ambient mode operation.

Based on the scene brightness level 20, the characteristics or speed of the film used, and the properties of the camera's optical system, it has been determined that proper exposure, balanced for depth of field and motion stopping ability, will be obtained if blade mechanism 12 is operated in a manner characterized by the trajectory curve F shown in FIG. 4.

The opening position, FO, is approximately parabolic, showing that the rate of change of aperture area starts out slowly and then progressively accelerates until a peak aperture, less than the maximum obtainable aperture, is defined at which point the direction of stepper motor drive is reversed to define the closing section, FC, which is essentially a mirror image of the opening section, FO. The symmetrical nature of F indicates that 50% of the total exposure light impinges upon the film unit 36 during the opening phase and the other 50% during the closing phase. That is, the blades are reversed at 50% of the total desired exposure.

Broadly speaking, the trajectory data base section of ROM includes data serving at least as characterizing elements of a plurality of different shaped curves. Typically, there will be data for a family of balanced trajectory curves which will vary in the shape of their opening and closing sections for different scene brightness levels. For relatively high brightness levels, the opening and closing slopes will be relatively shallow so that both the peak and average or effective aperture will be relatively small. For lower scene illumination levels, the opening and closing slopes will be steeper indicating that the blades will open more rapidly to a higher peak and effective aperture for a similar exposure interval to produce the same exposure value. Also, there will be additional data in the trajectory data base defining separate families of trajectories appropriate for depth of field and motion stopping ability emphasizing ambient modes and for the strobe flash mode.

In response to the various inputs, in this case balanced mode input 26 and scene brightness level input 20, the microprocessor 74, operating under the control of the instructional program and ROM 76, will select appropriate data from the balanced family of trajectories and develop therefrom a program of trajectory signals that will cause the stepper motor 14 to drive blade mechanism 12 in a manner characterized by the trajectory curve F.

There are, of course, many ways to program microcomputer 18. For example, the trajectory data base of ROM 76 could be programmed with enough data to define the entire curve F based on the pre-exposure input 20 alone. However, in a preferred embodiment it is programmed only to include data defining the shape of the opening portion of each of the plurality of trajectories for the reasons of programming economy and added flexibility. Additionally, the closed loop on the photocell reduces effects of parameter variations.

Microcomputer 18 initially provides the appropriate program of trajectory signals to effect the driving of blade mechanism 12 from its closed position toward its fully open position along trajectory portion FO. At this point, the illumination measuring circuit 40 and photocell 44 operate in a light integrating mode to monitor the image illumination level at the film plane and provide input 22. When the integrated light level reaches 50% of the total indicated as required by the pre-exposure input 20 and the film speed, the microprocessor 74 changes the program of trajectory signals to reverse the blade drive. The mirror image closing portion FC of the trajectory curve F is generated by reversing the opening trajectory signal program utilized up to the turn around point. That is, a record of the opening section of the trajectory signals is maintained in storage and then is utilized to define the mirror image closing portion of the trajectory.

If the operator wishes to emphasize depth of field or motion stopping ability, he merely changes the setting of selector switch 24 to provide either input 28 or 30. These inputs override selection from the balanced trajectory data and switch selection to the appropriate alternative program.

By appropriately programming microcomputer 18 to vary the rate of blade mechanism displacement, including acceleration or deceleration, during the course of an exposure interval, a wide variety of characterizing trajectory curves may be generated. These may have linear or nonlinear portions, or combinations of both. Also, they may be symmetrical or asymmetrical.

The dynamic response of exposure control system 10 is a major determining factor as to whether or not it can accurately generate a particular trajectory curve characterizing the operation of the blade mechanism 12. More accurate dynamic response is, of course, enhanced significantly by utilization of the positional feedback control loop and mode select system described earlier.

The Strobe Flash Subsystem

The strobe flash subsystem of exposure control system 10 automatically selects a strobe firing apeture and adjusts the light output of quenchable strobe unit 47 in response to scene brightness and distance inputs for providing the desired amount of artificial illumination contribution to exposure value. When the scene brightness is relatively low, the strobe contribution is relatively high. As scene brightness levels increase above a predetermined level (e.g., capable of achieving 75% of optimum exposure value at shutter speeds allowing hand held operation without image blur), ambient and flash illumination are mixed in a controlled manner so that the strobe unit primarily serves to provide a proportional fill flash capability.

The flash subsystem is configured to be compatible with and enhance the versatility of those aspects of the exposure control system 10 described up to this point. Advantageously, the cost of adding the flash capability is relatively low in that it only requires the addition of a strobe unit connector and a modest expansion of the microcomputer's memory section to accommodate the strobe operation data base and the additional control program for coordinating the firing and quenching of unit 47 with the operation of blade mechanism 12.

With this approach, integration of the flash capability into the overall exposure control system 10 is reduced to the task of providing microcomputer 18 with the appropriate data base and operating instructions to carry out a desired flash strategy.

During the design phase of a new camera incorporating system 10, new flash techniques can be explored simply by reprogramming. Another advantage is that it is possible to make small programming adjustments to "fine tune" the exposure control system to take advantage of selected exposure characteristics of the film and/or to compensate for the dynamic response characteristics of other components in the system. Also, as flash techniques improve in the future, these advances may be incorporated into new camera models by reprogramming at the factory.

As will become apparent, the position feedback control loop provides accurate tracking of the trajectory curve and allows the strobe to be fired and quenched at selected points along that curve with great precision. Unlike many of the prior art systems which are constrained to variation of either strobe firing aperture or strobe unit output in their flash strategy, the exposure control system embodying the present invention exploits variation of both aperture and strobe output as functions of scene brightness and camera-to-scene distance in its operating scheme. In doing this in conjunction with tailoring the trajectories for flash mode operation, the effective range of the strobe unit is significantly expanded for both close and far camera-to-subject distances.

Figure 5:
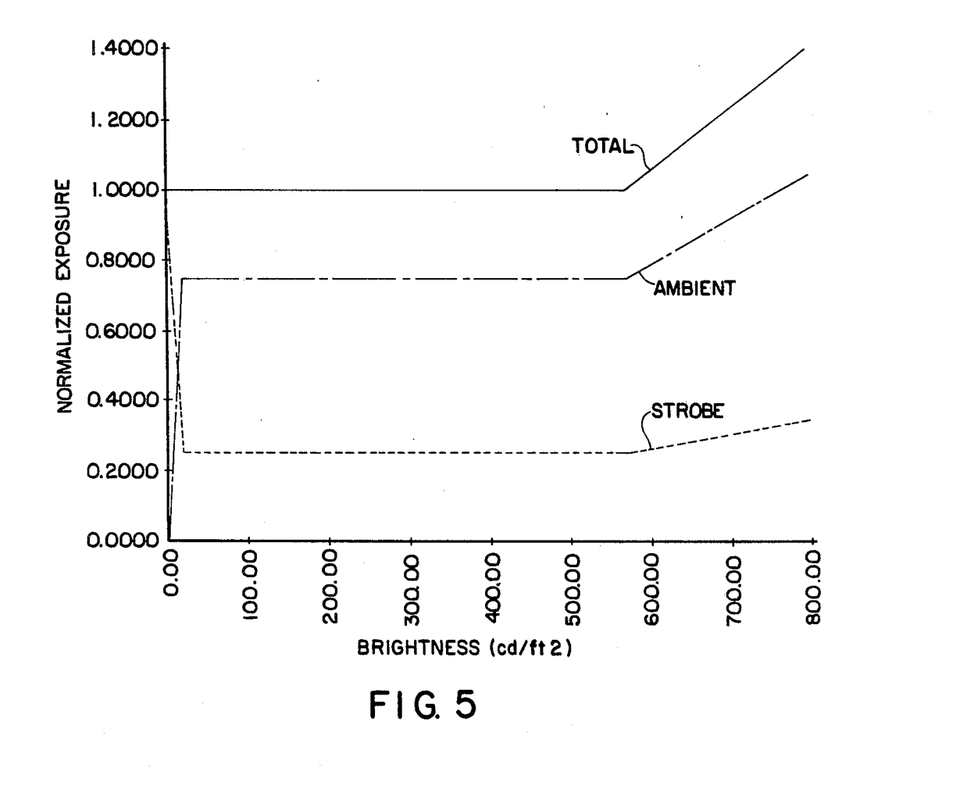
FIG. 5 is a graph showing the strobe mode tracking goal for the exposure control wherein ambient and strobe contributions to total exposure value are plotted as a function of normalized exposure and scene brightness.

A somewhat idealized strobe flash mode performance goal for exposure control system 10 is graphically depicted in FIG. 5 wherein exposure value is plotted as a function of normalized exposure (Y-axis) and ambient scene brightness level (X-axis). Total exposure is the sum of the strobe and ambient contributions at any point along the X-axis. The optimum exposure value is normalized at 1.00. The goal is to maintain exposure value at 1.00 from 0 to approximately 575 cd/(sq. ft.) and then linearly increase exposure value from 1.00 to 1.40 in the brightness range from 575 to 800 cd/(sq. ft.). Exposure value is increased in this high ambient range to compensate for reciprocity failure of the film and also to slightly overexpose the film for aesthetic reasons, i.e., emphasize the high brightness level of the scene. Another characteristic of this flash mode goal is to maintain the ratio of approximately 75% ambient to 25% flash illumination in that portion of the brightness range (above approximately 25 cd/(sq. ft.) for film speed of approximately 150 ASA) wherein the ambient level is high enough to provide 75% of the total utilizing a shutter speed that is acceptable for handheld camera operation. The selection of this particular ratio reflects current thinking in the photographic art as to scene lighting techniques that provide aesthetically pleasing photographs.

At the lowest end of the brightness scale, the strobe provides 100% of the scene illumination. As ambient brightness increases, the strobe contribution is decreased proportionally to maintain the total exposure at the normalized 1.00 value. At approximately 15 cd/(sq. ft.), there is a crossover (50% ambient plus 50% strobe). When the brightness level reaches approximately 25 cd/(sq. ft.) there is enough ambient light to provide 75% of the total and the strobe output is regulated to supply the remaining 25%. This same ratio is maintained for the increased exposure values in the 575 to 800 cd/(sq. ft.) range. The brightness figures given here will vary with fill speed.

Therefore, at low ambient levels, the strobe is the primary source of scene illumination for effecting film exposure. When the ambient brightness reaches a predetermined point (75%) that is below the optimum exposure value, then the strobe operates in a fill flash mode to provide supplemental illumination that is directed toward the scene from a direction that is usually different from the direction of the ambient light to soften or eliminate shadows cast by blockage of portions of the ambient light rays and also to increase the illumination of relatively dark areas of the scene to bring out details thereof and reduce contrast.

It must be emphasized at this point that the strobe mode plan shown in FIG. 5 is a goal only, and in practice interactive exposure parameters and performance limitations of certain of the components will not allow the goal to be met for various combinations of scene brightnesses and distances.

Thus, the flash mode strategy used in exposure control system 10 is to try and maintain the idealized flash mode goal over the widest range of scene brightness levels and camera-to-subject distances, and, when this is not possible because of strobe output limitations, available aperture limitations or adverse scene lighting conditions, to make adjustments that will provide the best possible photograph consistent with these limitations and conditions.

The amount of strobe light that reaches the film plane varies as a function of strobe output level, camera-to-scene distance, and effective aperture during the strobe firing interval. If the strobe output level is fixed, then effective aperture must be increased proportionally for increasing camera-to-scene distances to maintain the constant strobe contribution level. Conversely, if effective aperture is held constant, the strobe output level must be adjusted in accordance with scene distance.

The exposure control system 10 embodying the present invention selectively varies both effective aperture and strobe output level (by varying the timing of the quench signal) to regulate strobe contribution and expand the effective range of unit 47 as will become apparent later.

Perhaps more importantly, another flash parameter—variable trajectory shape—is available to contribute to the optimization of flash mode operation. That is, because the shutter can be programmed to generate a wide variety of different trajectory shapes, it is now possible to provide trajectories that are specifically designed to enhance flash mode operation. Unlike prior art systems wherein variation and trajectory shape is not available or is severely limited, trajectory shape can be exploited to advantage rather than being an obstacle that has to be worked around.

Figure 6:
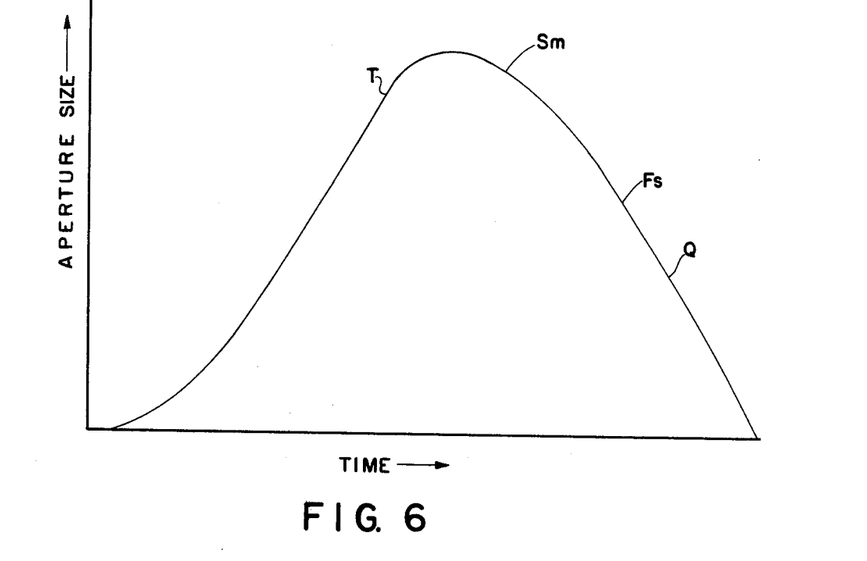
FIG. 6 shows a strobe flash mode trajectory curve with blade reversed, strobe fire and quench signal points indicated thereon.

FIG. 6 shows a typical trajectory curve generated by system 10 for fill flash operation. The integrated area under the curve is indicative of the ambient light contribution, which in this case is set to provide 75% of the total required exposure as determined by the pre-exposure scene brightness input. The remaining 25% will be supplied by the strobe unit 47.

During the course of the exposure interval, the instantaneous aperture defined by the blade mechanism 12 is represented by an encoder count or stop number. $S_m$ is the maximum obtainable aperture, in this example f 8.16, and corresponds to an encoder count $S_{52}$. It should be noted that in this particular illustrated embodiment $S_m$ is intentionally selected to occur slightly past the peak of the trajectory on the closing portion thereof. This is done to improve control because there may be some slight variation of the exact blade reversal point. That is, $S_m$ is chosen to occur at the largest aperture where blade position is very accurately defined and the blade drive system is more stabilized than at the turnaround portion at the absolute top of the trajectory.

In response to both the scene brightness and distance inputs, a strobe firing aperture, S, and a quench time, Q, are selected by microcomputer 18 in a manner to be set forth in detail later.

The blade mechanism 12 is driven in accordance with the developed trajectory signal program to define the opening slope. At time T the program provides a signal to reverse the direction of stepper motor drive. Between points T and $S_m$, the stepper motor decelerates and reverses direction in a manner to define the central peak portion of a trajectory.

During the closing portion of the curve, the strobe unit 47 is fired at the selected strobe firing aperture by the provision of a firing signal, $F_s$, and continues to emit light until it is quenched by the provision of quench signal Q. Thus, the amount of strobe contribution can be varied in two ways. First, by choosing aperture size and, secondly, by varying strobe output between minimum and maximum output levels in response to adjusting the interval between the firing signal, $F_s$, and the quench signal, Q.

The selection of the appropriate strobe firing aperture S and the corresponding quench time, Q, is performed automatically by microcomputer 18 utilizing the pre-exposure scene brightness and camera-to-scene distance inputs, b and d respectively, the preprogrammed strobe operation data base, and a control program for manipulating the data.

The following is an outline of one type of strobe mode parameter selection process that may be used with exposure control system 10.

The total camera-to-scene distance range is divided into four (4) sequential zones designated D1, D2, D3 and D4. In this example, D1 covers scene distance of approximately 1 to 3 ft.; D2, 3 to 9 ft; D3, 9 to 27 ft; and D4, 27 to 35 ft. In turn, each of the zones D is subdivided into small increments d. The increments d in zone D1 are designated $d_1$ to $d_{22}$; D2, $d_{23}$ to $d_{24}$; D3, $d_{45}$ to $d_{66}$; and D4, $d_{67}$ to $d_{72}$. $D_{72}$ is used for the furthest designated distance in zone D4 and all distance therebeyond which are beyond the effective flash range.

The output of strobe unit 47 is variable between a minimum output value of approximately 120 BCPS (quench time Q=100 microseconds) and a maximum value of approximately 1050 BCPS (quench time Q=2300 microseconds). For this type of selection process it is desirable to express the flash output range in terms of progressively increasing flash intervals designated $Q_1$ to $Q_{22}$. Representative values for d1 to d72, D1 to D4 and Q stored in the strobe operation data base are shown below in Table 1.

TABLE 1

| mi-cro-secs. | BCPS | D1 | | D2 | | D3 | | D4 | |
|---|---|---|---|---|---|---|---|---|---|
| $Q_1$ | 100 | 120 | $d_1$ | .922 | $d_{23}$ | 2.88 | $d_{45}$ | 9.03 | $d_{67}$ | 28.33 |
| $Q_2$ | 110 | 130 | $d_2$ | .968 | $d_{24}$ | 3.03 | $d_{46}$ | 9.51 | $d_{68}$ | 29.84 |
| $Q_3$ | 120 | 144 | $d_3$ | 1.02 | $d_{25}$ | 3.19 | $d_{47}$ | 10.01 | $d_{69}$ | 31.34 |
| $Q_4$ | 130 | 160 | $d_4$ | 1.07 | $d_{26}$ | 3.36 | $d_{48}$ | 10.55 | $d_{70}$ | 33.11 |
| $Q_5$ | 140 | 177 | $d_5$ | 1.13 | $d_{27}$ | 3.54 | $d_{49}$ | 11.11 | $d_{71}$ | 34.87 |
| $Q_6$ | 160 | 197 | $d_6$ | 1.19 | $d_{28}$ | 3.73 | $d_{50}$ | 11.71 | $d_{72}$ | $\geq 34.90$ |
| $Q_7$ | 170 | 218 | $d_7$ | 1.25 | $d_{29}$ | 3.93 | $d_{51}$ | 12.33 | | |
| $Q_8$ | 190 | 242 | $d_8$ | 1.32 | $d_{30}$ | 4.14 | $d_{52}$ | 12.99 | | |
| $Q_9$ | 210 | 269 | $d_9$ | 1.39 | $d_{31}$ | 4.36 | $d_{53}$ | 13.68 | | |
| $Q_{10}$ | 230 | 298 | $d_{10}$ | 1.46 | $d_{32}$ | 4.59 | $d_{54}$ | 14.41 | | |
| $Q_{11}$ | 260 | 331 | $d_{11}$ | 1.54 | $d_{33}$ | 4.84 | $d_{55}$ | 15.18 | | |
| $Q_{12}$ | 290 | 367 | $d_{12}$ | 1.62 | $d_{34}$ | 5.10 | $d_{56}$ | 15.99 | | |
| $Q_{13}$ | 330 | 407 | $d_{13}$ | 1.71 | $d_{35}$ | 5.37 | $d_{57}$ | 16.84 | | |
| $Q_{14}$ | 370 | 452 | $d_{14}$ | 1.80 | $d_{36}$ | 5.65 | $d_{58}$ | 17.74 | | |
| $Q_{15}$ | 420 | 502 | $d_{15}$ | 1.90 | $d_{37}$ | 5.95 | $d_{59}$ | 18.69 | | |
| $Q_{16}$ | 490 | 557 | $d_{16}$ | 2.00 | $d_{38}$ | 6.27 | $d_{60}$ | 19.69 | | |
| $Q_{17}$ | 580 | 618 | $d_{17}$ | 2.11 | $d_{39}$ | 6.61 | $d_{61}$ | 20.74 | | |
| $Q_{18}$ | 680 | 685 | $d_{18}$ | 2.22 | $d_{40}$ | 6.96 | $d_{62}$ | 21.84 | | |
| $Q_{19}$ | 850 | 760 | $d_{19}$ | 2.34 | $d_{41}$ | 7.33 | $d_{63}$ | 23.01 | | |
| $Q_{20}$ | 1090 | 844 | $d_{20}$ | 2.46 | $d_{42}$ | 7.72 | $d_{64}$ | 24.24 | | |
| $Q_{21}$ | 1510 | 936 | $d_{21}$ | 2.59 | $d_{43}$ | 8.13 | $d_{65}$ | 25.53 | | |
| $Q_{22}$ | 2300 | 1050 | $d_{22}$ | 2.73 | $d_{44}$ | 8.57 | $d_{66}$ | 26.89 | | |

The sequence of the selection process is more easily visualized with the aid of Table 2 below, which is also in the data base.

TABLE 2

| | D1 | D2 | D3 | D4 |
|---|---|---|---|---|
| d | $d_1$ $d_2$ $d_3$ ... $d_{22}$ | $d_{23}$ ... $d_{44}$ | $d_{45}$ ... $d_{66}$ | $d_{67}$ ... $d_{72}$ |
| $Q_t$ | $Q_1$ $Q_2$ $Q_3$ ... $Q_{22}$ | $Q_1$ ... $Q_{22}$ | $Q_1$ ... $Q_{22}$ | $Q_1$ ... $Q_6$ |

Once the camera-to-scene distance input d is received from sonar ranging and focusing system, computer 18 correlates with the data in Table 2 and assigns a temporary quench time, $Q_t$. The d input also indicates the corresponding zone D. For example, if $d=d_2$, then the scene is located in zone D1 and the temporarily selected quench time is $Q_2$. If $d=d_{66}$, the scene is in D3 and the quench time $Q_t$ is $Q_{22}$.

The particular zone D in which the scene is located will determine the selection of the strobe firing aperture. That is, in general, the aperture selected for D3 will be larger than the corresponding apertures for either of zones D2 or D1, but smaller than that selected for zone D4. Once having selected an appropriate aperture for a particular zone D, then the strobe output is varied in proportion to the distance of the scene from the near end of the designated zone D. That is, when the scene is at the near end of the zone D, the strobe output is at a minimum ($Q_1$). As the scene location progressively extends into the zone D, the strobe output is proportionally increased so that $Q_{22}$ is used for the last location d in that zone D. Thus, each zone is "covered" by modulating strobe output. When the scene distance jumps into the next zone, the aperture is increased to provide more light input to the film plane and that zone is covered by predetermined modulation of the strobe output.

The initial selection of $Q_t$ is temporary, however, because it is based solely on camera-to-scene distance before consideration of the brightness level b. That is, the initially selected $Q_t$ will be appropriate if the corresponding strobe firing aperture determined by D is smaller than $S_m$ using the trajectory curve for 75% ambient contribution selected in accordance with the brightness level b. For example, if the $S_m$ (designated peak aperture) for a given brightness level b is larger than the selected strobe firing aperture, then the initial selected $Q_t$ may be used to achieve the desired ambient-to-strobe contribution level. But if the camera-to-scene distance d is relatively long and the ambient level b is a fairly high whereby $S_m$ is equal to the selected strobe firing aperture then the strobe logic system will attempt to adjust (increase) the $Q_t$ by an appropriate increment to compensate for the aperture limitation to maintain the contribution ratio. If the required increment exceeds the maximum output, then the system will automatically fire the strobe at the peak aperture with maximum output ($Q_{22}$) to achieve the best possible exposure even though the target ratio of 75% ambient to 25% strobe cannot be maintained under these scene brightness and distance conditions.

Following the selection of the temporary selection of $Q_t$, microcomputer 18 consults a matrix table in the strobe operation data base to compare $S_m$ with the selected strobe firing aperture set forth therein as S (encoder step numbers). This matrix Table 3 is shown below along with Table 4 that may be used to convert encoder step number S to the corresponding f number. Note that in Table 4 encoder steps $S_0$ to $S_6$ correspond to the fully closed blade positions where the apertures 52 and 64 are completely out of registration to provide a good light seal. Thus the number of these positions is infinity.

TABLE 3

| b (cd/ft$^2$) | Inc | D1 | D2 | D3 | D4 | S$_m$ |
|---|---|---|---|---|---|---|
| 1 | 5 | 14 | 29 | 52 | 0 | 52 |
| 2 | 3 | 13 | 27 | 52 | 0 | 52 |
| 3 | 0 | 12 | 25 | 52 | 0 | 52 |
| 4 | 18 | 10 | 22 | 42 | 52 | 52 |
| 18 | 14 | 9 | 19 | 36 | 52 | 52 |
| 22 | 15 | 9 | 19 | 36 | 48 | 48 |
| 27 | 17 | 9 | 19 | 36 | 44 | 44 |
| 31 | 18 | 9 | 19 | 36 | 42 | 42 |
| 37 | 18 | 9 | 19 | 36 | 41 | 41 |
| 45 | 0 | 9 | 19 | 36 | 0 | 37 |
| 54 | 0 | 9 | 19 | 36 | 0 | 36 |
| 62 | 2 | 9 | 19 | 34 | 0 | 34 |
| 70 | 3 | 9 | 19 | 33 | 0 | 33 |
| 80 | 4 | 9 | 19 | 32 | 0 | 32 |
| 110 | 7 | 9 | 19 | 30 | 0 | 30 |
| 140 | 10 | 9 | 19 | 28 | 0 | 28 |
| 170 | 11 | 9 | 19 | 27 | 0 | 27 |
| 225 | 14 | 9 | 19 | 25 | 0 | 25 |
| 275 | 16 | 9 | 19 | 24 | 0 | 24 |
| 335 | 18 | 9 | 19 | 22 | 0 | 22 |
| 435 | 20 | 9 | 19 | 21 | 0 | 21 |
| 525 | 21 | 9 | 19 | 20 | 0 | 20 |
| 570 | 2 | 9 | 18 | 0 | 0 | 18 |
| 675 | 3 | 9 | 18 | 0 | 0 | 18 |
| 725 | 4 | 9 | 18 | 0 | 0 | 18 |
| 775 | 5 | 9 | 18 | 0 | 0 | 18 |
| >775 | 6 | 9 | 18 | 0 | 0 | 18 |

TABLE 4

| Encoder Step S | f# | Encoder Step S | f# |
|---|---|---|---|
| 0 | | 27 | 22.17 |
| 1 | | 28 | 20.50 |
| 2 | | 29 | 19.02 |
| 3 | | 30 | 17.73 |
| 4 | | 31 | 16.60 |
| 5 | | 32 | 15.62 |
| 6 | | 33 | 14.76 |
| 7 | 218.5 | 34 | 13.99 |
| 8 | 147.0 | 35 | 13.33 |
| 9 | 113.36 | 36 | 12.76 |
| 10 | 95.21 | 37 | 12.24 |
| 11 | 84.8 | 38 | 11.76 |
| 12 | 75.3 | 39 | 11.32 |
| 13 | 68.2 | 40 | 10.75 |
| 14 | 62.06 | 41 | 10.25 |
| 15 | 56.63 | 42 | 9.95 |
| 16 | 51.81 | 43 | 9.67 |
| 17 | 47.53 | 44 | 9.42 |
| 18 | 43.74 | 45 | 9.19 |
| 19 | 40.37 | 46 | 8.97 |
| 20 | 37.35 | 47 | 8.78 |
| 21 | 34.64 | 48 | 8.60 |
| 22 | 32.20 | 49 | 8.43 |
| 23 | 29.99 | 50 | 8.28 |
| 24 | 27.97 | 51 | 8.16 |
| 25 | 26.02 | 52 | 8.16 |
| 26 | 24.06 | 53 | 8.16 |

In Table 3 D selects the column for strobe firing aperture and scene brightness selects the row. $S_m$ designate the peak aperture achieved during the trajectory selected in accordance with b. Increment (Inc) is the number of quench time increments to be added to $Q_t$ if $S = S_m$. When the table value for $S = O$, this indicates the aperture differential is too great to be corrected by increasing quench time.

This scheme may be summarized as follows:
(1) If S is lower than $S_m$, use $Q_t$.

(2) If $S = S_m$, increase $Q_t$ by the Inc level in Table 3, i.e. use $S = S_m$; $Q = Q_t + $ Inc.
(3) If $S = S_m$ and $Q_t + $ Inc $\geq Q_{22}$, use $S = S_m$ $Q = Q_{22}$.
(4) IF $S = O$ indicating that the aperture differential is too great, use $S = S_m$ $Q = Q_{22}$.

The following examples are provided to illustrate various aspects of this stobe flash method:

EXAMPLE I

If d = 5.10 ft. and b = 110 cd/ft$^2$
From Table I, d = d$_{34}$; D = D$_2$ and $Q_t = Q_{12}$
From Table 3, Row 110, Column D2, S = 19 (f 40.37)
Row 110, Column $S_m$, $S_m = 30$ (f 17.73)
Thus, the strobe firing aperture f40.37 is smaller than the peak aperture f17.73 and there is no necessity to increase the temporarily selected quench time $Q_{12}$.

During the exposure interval, blade mechanism 12 will be driven in accordance with the selected trajectory program for b = 110 cd/ft$^2$. After the opening and top turnaround portions of the trajectory are defined, the blades will be closing and when the encoder input indicates that S = 19 (f40.37), the strobe unit 47 will be fired. The $Q_{12}$ level quench signal will be triggered 290 microseconds after firing to provide the corresponding output of 367 BCPS.

It should be noted from Table 3 that if d remains the same at d$_{34}$, then the ambient brightness level may increase up to b = 570 cd/ft$^2$ before the peak aperture $S_m = 18$ (43.74) and the distance related strobe firing aperture S = 18 are the same.

In this case, $S = S_m$ so the Inc 2 is adeed to $Q_{12}$ to provide an adjusted quench time of $Q_{14}$. Therefore, the strobe provides an output of 452 BCPS rather than the initially selected 367 BCPS to compensate for the limitation in aperture size imposed by the trajectory selected for this higher brightness level to provide the ambient component of the exposure.

Full compensation is achievable when $Q_t + $ Inc does not exceed the maximum output level $Q_{22}$. If the indicated increment had been 11 or more full compensation would not be possible and the strobe would fire at the $Q_{22}$ level to provide the best picture possible under these circumstances. However, in this example with d remaining constant at d$_{34}$, the required increment of 6 at the highest brightness level >775 does not exceed the maximum output $Q_{22}$.

EXAMPLE 2

Let b = 225 cd/ft$^2$ remain constant d = 2.00 ft
From Table 1, d = d$_{16}$; D = D1 and $Q_t = Q_{16}$
From Table 3, $S_m = 25$; S = 9, so no increment need be added to the quench time
If d increases to 6.27 ft
From Table 1, d = d$_{38}$; D = D2; $Q_t = Q_{16}$
From Table 3, $S_m = 25$; S = 19, again no increment need be added to quench time
If d increases to 19.69 ft
From Table 1, d = d$_{60}$; D = D3; $Q_t = 16$
From Table 3, $S_m = 25$; S = 25

Because $S = S_m$, an increment of 14 must be added to $Q_t$. However, because $Q_{16} + 14$ exceeds $Q_{22}$, full compensation is not possible and the strobe will automatically fire at the $Q_{22}$ level at $S_m$ to provide the best picture possible under these conditions.

It will be noted that if the scene is closer, say at d$_{52}$, but still within the D3 zone, then $Q_t = 8$ and the Inc 14 can be added to provide full compensation without exceeding the flash output limit.

If d increases to where it is in zone D4, at this level of brightness the table will show S=0. Therefore, the strobe will fire at $S_m$ at the $Q_{22}$ level.

From Table 3 it can be seen that as ambient brightness level increases, the size of the peak aperture which is available decreases so that the flash system "runs out of" available aperture for strobe firing at the higher brightness levels and longer camera-to-subject distances.

Figure 7:
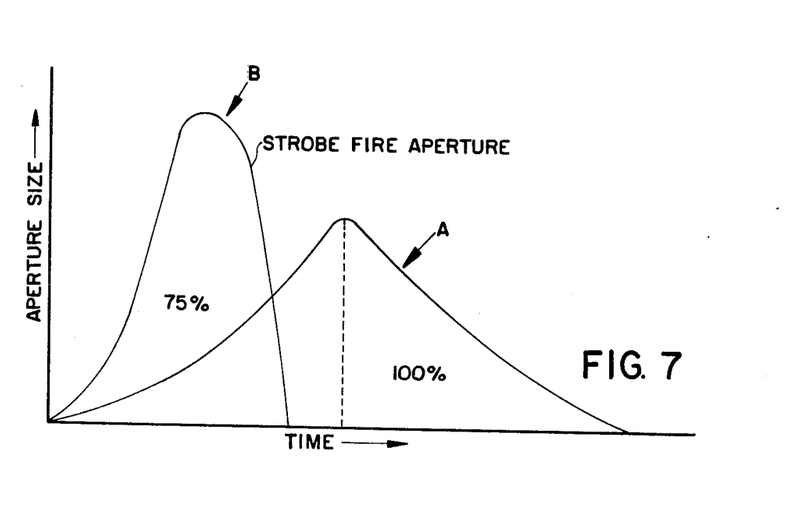
FIG. 7 shows a comparison of a balanced ambient mode and a strobe flash mode trajectory selected for the same scene brightness level.

Part of this limitation can be overcome by tailoring the shape of the trajectories used in the strobe mode of operation to emphasize or boost peak aperture. By way of example, FIG. 7 shows an ambient mode trajectory A and a flash mode trajectory B provided by microcomputer 18 in response to the same level of ambient brightness and scene distance. It will be noted that the flash mode trajectory has steeper slopes in the opening and closing portion and reaches a higher peak aperture $S_m$ to provide more head room for the strobe component. Some depth of field is given up, but it is more important to extend the range of flash coverage.

Thus, in the strobe flash method used in this illustration, the effective range of the flash unit is extended by a combination of techniques. First, trajectories are specially shaped for flash mode operation to provide larger peak apertures. Secondly, modulation of the strobe extends the range outwardly at the far end and inwardly at the close end. That is, for near scene distances the combination of small aperture and minimum strobe output will allow picture to be taken at closer distances without flash burnout than if the output level of the strobe unit is fixed. At longer scene distances a modulation of the strobe allows range extension when aperture size may be limited.

It will be noted that dividing the camera-to-scene distance range into zones for flash firing aperture selection reduces the amount of memory capacity needed when compared to a scheme wherein firing aperture would have to be assigned separately for each of the distance $d_1$ to $d_{72}$.

Those skilled in the art will appreciate that the strobe flash method set forth above is only but one of many different ways exposure control system 10 may be programmed for flash photography. Therefore, the method should be considered in its different aspects. First, it provides a way for extending the effective range of a quenchable strobe unit. Secondly, and perhaps more importantly, it serves to illustrate the versatility of exposure control system 10 and how easily it may be adapted by reprogramming to explore and exploit new flash methods.

Since certain changes may be made in the above-described exposure control system, method and photographic apparatus incorporating the same, without departing from the scope and spirit of the invention herein involved, it is intended that all matter contained in the above description or shown in the accompanying drawings shall be interpreted as being illustrative and not in a limiting sense.

What is claimed is:

1. An exposure control system usable in a camera for controlling transmission of image-forming light rays from a scene to a film unit located in a film plane during ambient light and strobe flash illumination modes of operation, said system comprising:

a blade mechanism;

means for mounting said blade mechanism for displacement between a first arrangement wherein it blocks transmission of scene light to the film plane and a second arrangement wherein it defines a maximum aperture, said blade mechanism serving to define a range of progressively increasing sized apertures as it moves from its said first arrangement toward its said second arrangement and then a range of progressively decreasing sized apertures as it returns to its said first arrangement during the course of an exposure interval for regulating transmission of scene light to the film plane;

drive means responsive to a program of trajectory signals for driving said blade mechanism in a manner whereby its operation is characterized by an aperture size versus time trajectory curve defined by said program of trajectory signals;

means for connecting a quenchable strobe unit to said system to provide a source of artificial illumination directed toward the scene, the light output of the strobe unit being variable between minimum and maximum output values by adjusting the timing of a quench signal provided to said unit subsequent to its firing;

means selectively operable for setting said system alternately in either its ambient light or strobe flash mode of operation;

means for providing pre-exposure inputs indicative of scene brightness level and camera-to-scene distance; and control means including a first memory section having a preprogrammed trajectory data base stored therein, said trajectory data base including at least characterizing elements of a plurality of different signal programs defining both ambient light and strobe flash mode trajectory curves that are appropriate for differing scene brightness levels, and a second memory section having stored therein a preprogrammed strobe firing aperture and quench time data base correlated to at least one set of flash mode trajectory curves for various combinations of scene brightness and distance, said control means further including means responsive to said brightness input, when said system is set for said ambient light mode, for utilizing said trajectory data base and developing therefrom a program of trajectory signals to provide a selected ambient light trajectory curve appropriate for the indicated scene brightness level, and for feeding said program of trajectory signals to said blade drive means to effect exposure of the film unit, and, when said system is set for said strobe flash mode, for developing and feeding to said blade drive means a program of trajectory signals to provide a selected flash mode trajectory curve appropriate for the indicated scene brightness level, said last-mentioned means also being responsive to both said scene brightness and distance inputs for utilizing said strobe data base and developing therefrom a selected firing aperture and quench time correlated to said selected flash mode trajectory curve and for providing corresponding strobe fire and quench signals to said strobe unit at appropriate times during said exposure interval.

2. The exposure control system of claim 1 wherein said control means includes a digital computer.

3. The exposure control system of claim 2 wherein the camera to scene distance range is divided into a plurality of sequential zones extending between a first zone closest to the camera and a last zone furthest away therefrom, each said zone having its own predetermined length measured between a near end closest to the camera and a far end opposite said near end, and said computer is preprogrammed to select a strobe firing aperture correlated to scene brightness level and the particular zone within which the scene is located as indicated by said distance input and to select a quench time correlated to the location of the scene within the particular zone in proportion to the length of that zone whereby in accordance with the provisions of said strobe operation data base the flash output is increased proportionally as scene location increases from the close end of that zone towards its far end.

4. The exposure control system of claim 3 wherein said computer is preprogrammed to increase the quench time initially designated in said strobe operation data base by an increment indicated therein correlated to the peak aperture of the flash mode trajectory selected in accordance with the brightness input if said peak aperture and the selected strobe firing aperture are equal.

5. The exposure control system of claim 4 wherein said computer is preprogrammed to select the maximum quench time when said initially indicated quench time plus said indicated increment exceeds said maximum quench time and to fire said strobe unit at said peak aperture.

6. The exposure conrol system of claim 1 wherein strobe mode trajectories developed from said trajectory data base have a shape that is different from balanced ambient mode trajectories to enhance strobe mode operation.

7. The exposure control system of claim 6 wherein said strobe mode trajectories have a larger peak aperture than the balanced ambient mode trajectories for the same scene brightness level.

8. The exposure control system of claim 1 wherein said strobe mode includes a proportional fill flash mode.

9. The exposure control system of claim 1 wherein said control means includes a computer that is preprogrammed to selectively vary strobe firing aperture, quench time and trajectory shape in accordance with said scene brightness and distance inputs to control strobe mode exposures.

10. The exposure control system of claim 1 wherein said blade drive means includes a stepper motor and said strobe firing aperture is designated in said strobe operation data base in terms of blade step positions referenced to an initial step position.

11. A camera for use with a variable light output quenchable strobe unit, said camera including means for defining a film plane and means for transmitting image forming light rays from a scene to expose a film unit located in the film plane, said camera comprising:
a blade mechanism;
means for mounting sad blade mechanism for displacement between a first arrangement wherein it blocks transmission of scene light to the film plane and a second arrangement wherein it defines a maximum light transmissive aperture, said blade mechanism serving to define a range of progressively increasing sized apertures as it moves from its said first arrangement towards its said second arrangement and then a range of progressively decreasing sized apertures as it returns to its said first arrangement for controlling transmission of scene light to the film plane during an exposure interval;
means responsive to a program of trajectory signals for driving said blade mechanism in a manner whereby its operation is characterized by an aperture size versus time trajectory curve defined by said program of trajectory signals;
means for storing at least characterizing elements of a plurality of different trajectory signal programs defining different corresponding trajectory curves that are appropriate for various photographic conditions relating to scene brightness and camera-to-scene distance;
means for providing a pre-exposure brightness input signal indicative of the brightness level of the scene before initiation of an exposure interval;
means for providing a pre-exposure range input signal indicative of camera to scene distance before initiation of said exposure interval;
means for storing preprogrammed data for selecting an appropriate strobe firing aperture and quench time for various combinations of scene brightness level and camera to scene distance; and
electronic control means responsive to at least said brightness input signal for developing a corresponding trajectory signal program from said stored characterizing elements and applying said developed program to said drive means to effect an exposure interval, and responsive to both said brightness and range input signals for selecting the appropriate strobe firing aperture and quench time from said stored preprogrammed data and effecting the firing and quenching of the strobe unit in accordance with the selected strobe operating parameters at appropriate times during the exposure interval.

12. The camera of claim 11 wherein said means for storing elements of different trajectory signal programs, said means for storing data for firing aperture and quench time selection and electronic control means are incorporated into a digital computer.

13. The camera of claim 12 wherein said drive means includes a stepper motor and said firing aperture data is correlated to the step position of said motor in relation to an initial step position.

14. A method of strobe flash photography wherein a digital computer is used to facilitate control over scene illumination and film exposure, said method being automatically carried out with a camera of the type including a progressively variable aperture scanning blade mechanism for controlling transmission of image forming light rays from a scene to a film unit at a film plane, drive means responsive to a program of trajectory signals for driving said blade mechanism in a manner whereby its operation is characterized by an aperture size versus time trajectory curve defined by said trajectory signal program, means for providing separate input signals indicative of the ambient light brightness level of the scene and camera to scene distance, a variable light output quenchable strobe unit configured so that its output may be varied from a minimum to a maximum output level by selectively increasing the interval between strobe firing and quenching signals and a digital computer preprogrammed to control operation of the camera in accordance with the steps of this method and including a trajectory curve data base correlated, at least, to ambient light brightness of the scene and a strobe operating data base correlated to ambient light brightness level of the scene, the classification of camera to scene distance in terms of a particular one of a plurality of sequential zones into which the camera to scene distance range of the camera is divided, and the location of the scene within the particular zone as a function of the zone length measured between its close and far ends, said method comprising the steps of:

(1) actuating said camera to initiate an automatic cycle of operation, including a pre-exposure phase followed by a film exposure phase, under the control of said computer; during said pre-exposure phase (2) automatically providing said separate input signals to said computer indicative of ambient light scene brightness level and camera to scene distance;

(3) in accordance with said indicated brightness level, utilizing said computer to develop a corresponding trajectory signal program from said trajectory data base providing a selected trajectory curve appropriate for the selected ambient light contribution to the film exposure;

(4) in accordance with both the indicated brightness level and camera to scene distance, utilizing said computer to select a strobe firing aperture and quench time from said strobe operating data base to provide the selected artificial illumination contribution to the film exposure; and during the film exposure phase (5) feeding the developed program of trajectory signals to said drive means for driving said blade mechanism to define the exposure interval; and (6) providing strobe firing and quench signals to said strobe unit at appropriate times during said exposure interval to fire said strobe at the selected aperture for the selected interval.

15. The method of claim 14 wherein the step of selecting the strobe firing aperture and quench time includes selecting a firing aperture correlated to scene brightness and the particular zone in which the scene is located, selecting a quench time correlated to the distance of scene location into the particular zone as a function of its overall length, comparing the selected strobe firing aperture to the peak aperture of the trajectory curve selected for the indicated brightness level; and (1) if the selected strobe firing aperture is smaller than said peak aperture, utilizing said selected firing aperture and quench time;

(2) if the selected firing aperture is equal to said peak aperture, increasing the quench time by increments correlated to peak aperture as indicated in said strobe operating data base; and (3) if selected quench time plus the indicated increment is greater than the maximum quench time, firing the strobe unit at the peak aperture for the maximum interval.

16. The method of claims 14 or 15 wherein the camera is configured for both ambient light and strobe flash modes of operation and the trajectory curves developed for flash mode operation have higher peak apertures than comparable ambient mode trajectories selected for the same scene brightness level thereby extending the range of scene brightness and distance combinations wherein the flash contribution may be maintained by a selected proportion of total exposure value.

* * * * *